(12) United States Patent
Hershenson

(10) Patent No.: US 9,332,368 B1
(45) Date of Patent: May 3, 2016

(54) ACCELEROMETER OR TRANSDUCER ON A DEVICE

(71) Applicant: Google Inc., Mountain View, CA (US)

(72) Inventor: Matthew J. Hershenson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/936,318

(22) Filed: Jul. 8, 2013

(51) Int. Cl.
*H04R 29/00* (2006.01)
*A61F 11/06* (2006.01)

(52) U.S. Cl.
CPC .................... *H04R 29/004* (2013.01)

(58) Field of Classification Search
CPC ...... H04R 17/02; H04R 1/00; H04R 2201/00; H04R 2203/00; H04R 2499/11; H04R 29/00; H04R 29/004; H04R 3/005; H04R 1/1041; G10K 2210/129
USPC ........... 381/173, 178, 71.1–71.12, 94.1–94.9, 381/58, 122, 111
See application file for complete search history.

(56) References Cited

U.S. PATENT DOCUMENTS

| 2009/0103744 A1* | 4/2009 | Klinghult | H04R 3/04 381/71.1 |
| 2012/0259628 A1 | 10/2012 | Siotis | |
| 2014/0192061 A1* | 7/2014 | Payne | G02B 26/02 345/501 |
| 2014/0270231 A1* | 9/2014 | Dusan | G10L 25/90 381/74 |

OTHER PUBLICATIONS

Gizmag Team,"Middle ear microphone aims to improve cochlear implants", Gizmag, Available at: http://www.gizmag.com/middle-ear-microphone/22343/, 8 pages, Apr. 30, 2012.
Kim et al.,"Adaptive Noise Cancellation Using Accelerometers for the PPG Signal from Forehead", Proceedings of the 29th Annual International Conference of the IEEE EMBS, pp. 2564-2567, France, 2007.

* cited by examiner

*Primary Examiner* — Vivian Chin
*Assistant Examiner* — Ammar Hamid
(74) *Attorney, Agent, or Firm* — Morris & Kamlay LLP

(57) ABSTRACT

A device is provided that includes a microphone, a surface, an accelerometer or transducer, and a processor. The surface may be substantially transparent and have a side that is exposed to an external environment. The accelerometer or transducer may be coupled to the side of the surface that is exposed to the external environment and it may be utilized to obtain at least one measurement of acceleration of the surface based on an acoustic vibration. The processor may receive the accelerometer's or transducer's measurement and an input from the microphone. The processor may generate an output based on the accelerometer or transducer measurement and microphone input.

20 Claims, 4 Drawing Sheets

ACCELEROMETER OR TRANSDUCER ON A DEVICE

BACKGROUND

Sound is a mechanical wave that is an oscillation of pressure. A mechanical wave can cause local oscillation of a material. Sound can travel through many mediums and a sound wave can be affected by the medium through which it travels. Thus, sound may be considered a vibration which can be measured by a device such as an accelerometer. Single- and multi-axis accelerometers can detect magnitude and direction of acceleration. They may also be used to detect orientation and other features. Accelerometers are commonly used in many computing devices to orient the screen, sometimes in combination with a magnetometer and/or a gyroscope. Microelectromechanical systems ("MEMS") accelerometers have been applied to musical instruments to detect audio or acoustic information. Accelerometers have been utilized as a component of cochlear implants to assist hearing impaired individuals. An accelerometer in a mobile device typically measures the acceleration that it experiences relative to a free-fall.

BRIEF SUMMARY

According to an implementation of the disclosed subject matter, a device is provided that can include a microphone, a surface, an accelerometer, and a processor. The surface may include a substantially transparent material that can have a side exposed to an external environment. The accelerometer may be coupled to the side of the surface exposed to the external environment and it may be configured to obtain a measurement of acceleration of the surface based on an acoustic vibration of the surface. The processor may be coupled to the device and it may be configured to receive the measurement from the accelerometer based on the acoustic vibration of the surface. The processor may receive an input from the microphone. The processor may generate an output based on the input received from the microphone and the measurement from the accelerometer.

In an implementation, at least one measurement of acceleration of a surface may be received from an accelerometer or determined based on a measurement provided by a transducer. The at least one measurement may correspond to an acoustic vibration of a surface. The surface, as described above, may have a side that is exposed to an external environment. The accelerometer or transducer may be coupled to the side of the surface that is exposed to the external environment. An input may be received from a microphone. An output may be generated based on the input received from the microphone and the at least one measurement from the accelerometer.

An advantage of the disclosed device is that the overall signal to noise ratio may be increased such that, for example, a person speaking into a phone may sound clearer to the individual receiving the call. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

In an implementation, a signal to noise ratio may be augmented by affixing an accelerometer or transducer on the front glass of a mobile device. A mobile device such as a smartphone may utilize one or more microphones to reduce noise and/or to detect a person speaking into the phone (e.g., the signal). An accelerometer or transducer may be used to detect the vibration of glass or other surface on a smartphone that may occur when a person speaks with the phone positioned alongside a person's face (e.g., near the person's ear and mouth). Thus, the physical movement of the screen may be detected and converted to a quantifiable number that, in turn, may be processed in addition to sound detected using a microphone. The additional information provided by the accelerometer or transducer may be used to improve the voice resolution and to reduce ambient noise that is unrelated to or interfering with the user's speech.

Figure 1:
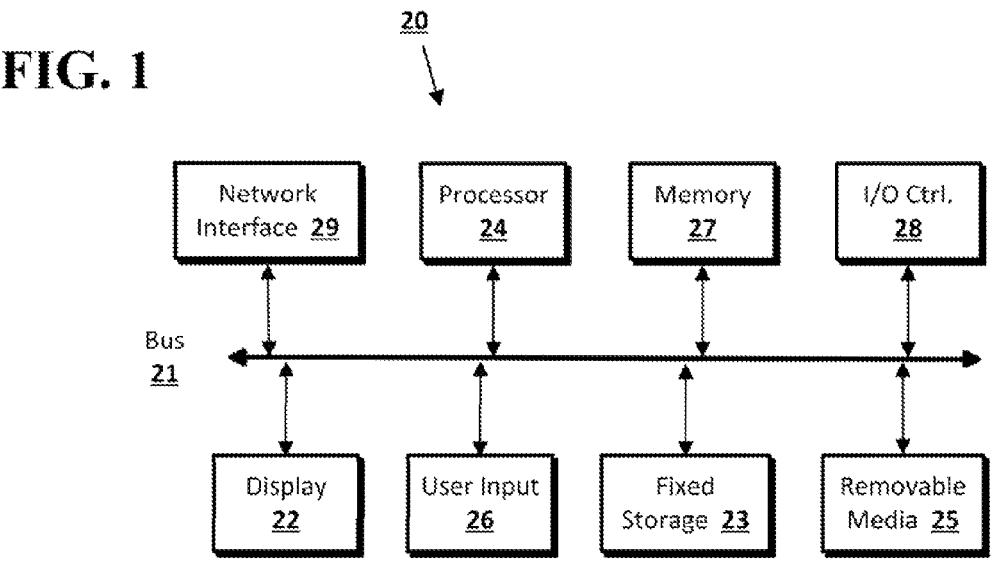
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
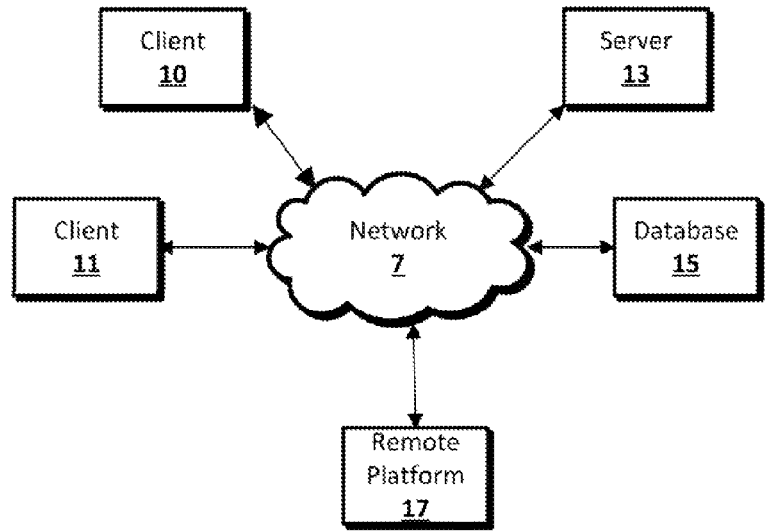
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
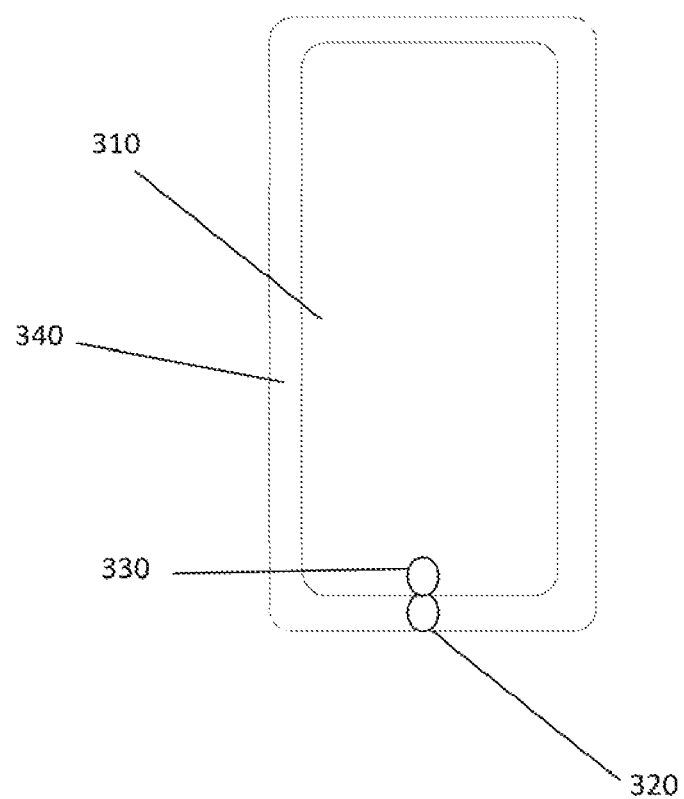
FIG. 3 shows an example arrangement of an accelerometer and a microphone on a device according to an implementation disclosed herein.

In an implementation, an example of which is shown in FIG. 3, a device is provided that includes a microphone 320, a surface 310, an accelerometer or transducer 330, and a processor. In the example shown in FIG. 3, the surface 310 is bordered by a housing or case 340. The device, for example, may be a mobile device, a computing device, a tablet, or the like. A microphone may refer to any device that converts mechanical vibration into an electrical signal. For example, a microphone may utilize electromagnetic induction, capacitance change, piezoelectric generation, or light modulation to produce an electrical voltage signal from a mechanical vibration. One or more microphones may be present on the device. The acoustic vibration detected by a microphone may be utilized to process and/or filter the acoustic vibration such that the desired signal to ambient sound or noise ratio is improved.

The surface may be composed of a substantially transparent or transparent material in some configurations. Examples of such material may include, but is not limited to, glass, silicon, plastic, sapphire, etc. The material may also be a composite of two or more materials. In some instances, one of the materials may not be substantially transparent; however, the combination of all materials may result in a surface that is substantially transparent. A side of the surface may be exposed to an external environment. For example, the surface may a component of a mobile phone. It may be attached to a housing or case. Electronics necessary for the phone to operate, such as a computer-readable storage medium, a processor, and RAM may be disposed between the surface and the housing. The side of the surface exposed to the internal environment may refer to the side of the surface disposed between the material and the housing. In some instances the housing may not cover the entirety of the surface. For example, the housing may be affixed to the surface only on the side exposed to the internal environment. In some configurations, the surface may contain electronics that are imbedded in the material that makes up the surface itself (e.g., no housing or case is attached to the material). In such instances, the entirety of the surface exposed to the atmosphere may be considered side exposed to the external environment.

The accelerometer or transducer may be coupled to the side of the surface exposed to the external environment. It may be configured to obtain at least one measurement of acceleration of the surface based on an acoustic vibration of the surface. An accelerometer may measure proper acceleration, which may refer to the physical acceleration, such as acceleration as measured by the accelerometer as experienced by an object. It may be acceleration relative to freefall. One or more accelerometers may be utilized in accordance with any implementation disclosed herein. An acoustic vibration, or sound, may be a mechanical wave that is an oscillation of pressure transmitted through a medium. The medium may influence the way the vibration is perceived. Generally, the audible range of humans is 20 Hz to 20 kHz. Sound may cause a vibration of the side of the surface exposed to an external environment. The vibration of the surface may be caused by, for example, a person speaking into the device such as a mobile phone and/or ambient sound or background noise. Typically, a higher signal to noise ratio is desirable in audio communications. An accelerometer or transducer may be utilized to measure the combination of the signal and ambient noise. The accelerometer or transducer may be coupled to the surface utilizing a variety of methods. For example, the accelerometer may be mechanically connected or secured to the surface or it may be chemically bonded to the surface. In some configurations, the accelerometer may be embedded in the surface such that it is exposed to the external environment. In some configurations, more than one accelerometer may be utilized in accordance with any of the implementations disclosed herein.

A skilled artisan will know that many different types of accelerometers exist today such as capacitive, piezoelectric, piezoresistant, and magnetoresistive. Any device that measures the acceleration of the side of the surface exposed to the external environment may be utilized according to the implementations disclosed herein. For example, a piezoelectric accelerometer or transducer may utilize a microcrystalline substance that produces an electric charge when a mechanical vibration is applied to it. The piezoelectric substance may be attached to a mass in the accelerometer that may be displaced if acceleration is applied to the mass. The force causing the deformation of the substance may cause a charge to be generated that is proportional to the acceleration according to Newton's law (Force=mass×acceleration). In some accelerometers, the mass may be attached to a spring whose displacement may be measured to determine acceleration.

A processor may be coupled to the device. The processor may receive one or more measurements from the accelerometer or transducer based on the acoustic vibration of the surface. In some instances, the accelerometer may measure acceleration and transmit those measurements of acceleration, directly or indirectly, to the processor. The processor may receive an input from the microphone. For example, a typical smartphone contains a microphone into which a person speaks. The microphone may be embedded in the surface and exposed to the external environment. Other microphones may also be present on the device to assist with noise reduction from ambient sound. The sound detected by the microphone, including signal and ambient sound, may be referred to as an input. Similarly, a transducer, such as a pressure sensor, may also detect vibration of the front surface as a variation in relative pressure.

The processor may be configured to generate an output based on the input received from the microphone and at least one measurement from the accelerometer or transducer. For example, in a smartphone, the microphone input and the acoustic vibration detected by the accelerometer or transducer may be utilized to generate an output that may be transmitted to a second device (e.g., a mobile phone, computing device, land phone, etc.). The output may be a processed form of the input and/or acoustic vibration detected by the accelerometer or transducer. For example, the measurement from the accelerometer or transducer may include a first audio signal and a first ambient noise. The input from the microphone may include a second audio signal and a second ambient noise.

The output may be a third audio signal and third ambient noise. The ratio of the third audio signal to the third ambient noise may be greater than (1) the ratio of the second audio signal and the second ambient noise, (2) the ratio of the first audio signal and the first ambient noise, and/or (3) the ratio of the first and second audio signals and the first and second ambient noises. A variety of techniques may be utilized to filter or process the acoustic vibration detected by the microphone and/or accelerometer such as: spectral estimation, application of the NIST Signal To Noise Ratio algorithm, estimation of the signal to noise ratio based on a low-energy envelope in frequency bands, and/or Waveform Amplitude Distortion Analysis.

Figure 4:
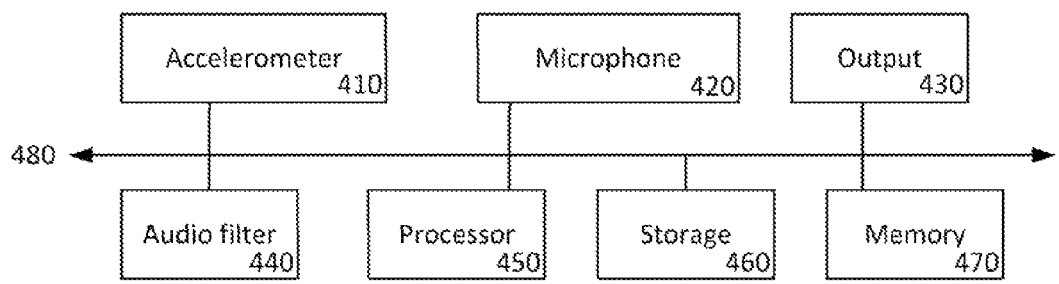
FIG. 4 shows an example configuration of components of a device according to an implementation disclosed herein.

An example configuration of components of the device is shown in FIG. 4. The accelerometer or transducer 410 and microphone 420 may transmit or send measurements or input to the system bus 480. The measurements may be stored in long term or fixed storage medium 460 or short term memory such as RAM 470. The processor 450 may determine, based on the origin of the data collected (e.g., the accelerometer measurements and/or microphone input) that the data need to be filtered. A separate component may perform the audio processing such as the audio filter block 440. The audio filter block may include one or more algorithms for audio processing. In some instances the audio filter 440 may perform conversion of signals from digital to analog or vice versa as needed. Once the data have been filtered to improve the signal to noise ratio, the processor may direct the filtered audio data to be output 430. The output 430 may be, for example, data sent to a speaker of another device such as a computer, tablet, mobile device, or smartphone.

In some configurations, the processor may cause at least part of the at least one measurement of acceleration to destructively interfere with at least part of the input from the microphone. Destructive interference may refer to an instance where a crest of one wave meets a trough of another wave and the magnitude of the displacements is equal to the difference in the individual magnitudes. An accelerometer or transducer may be positioned distal to a microphone on a device such as a mobile phone. It may be assumed that the majority of the acoustic vibration detected by the accelerometer or transducer represents ambient noise. Likewise, it may be assumed that the majority of the acoustic vibration detected by the microphone may be deemed an audio signal. The acoustic vibration detected by the accelerometer or transducer may be used to destructively interfere with the acoustic vibration detected by the microphone. Based on the assumptions stated above, the ambient noise should be eliminated from the audio signal, thereby improving the overall signal to noise ratio. A similar technique is used, for example, in some noise cancelling headphones or active vibration control mechanisms. In some configurations, the processor may be configured to invert the first ambient noise signal and cause it to destructively interfere with at least part of the input from the microphone. Assuming that the microphone detects a similar acoustic vibration as the accelerometer or transducer, inverting the ambient noise of the acoustic vibration detected by the microphone and applying it to the input from the microphone may silence at least a part of the ambient noise.

Figure 5:
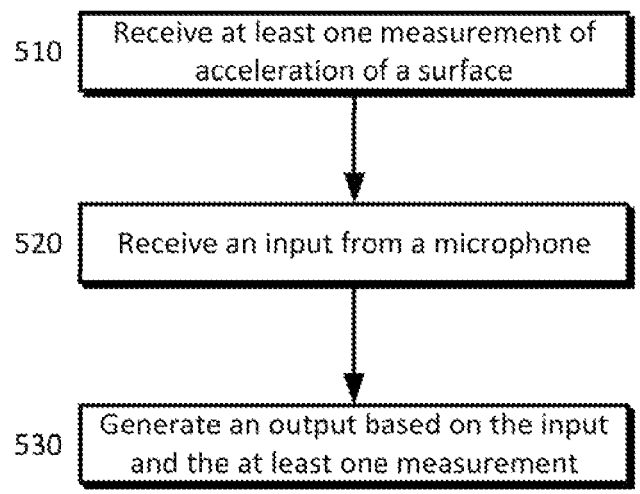
FIG. 5 shows an example of using a measurement from an accelerometer or transducer and a microphone to generate an output according to an implementation.

FIG. 5 shows an example of using a measurement from an accelerometer or transducer and a microphone to generate an output. In an implementation, at least one measurement of acceleration of a surface may be received from an accelerometer or determined based on a measurement provided by a transducer at 510. The at least one measurement may correspond to an acoustic vibration of a surface. The surface, as described above, may have a side that is exposed to an external environment. The accelerometer or transducer may be coupled to the side of the surface that is exposed to the external environment. The external surface may be transparent or substantially transparent. An input may be received from a microphone at 520. An output may be generated based on the input received from the microphone and the at least one measurement from the accelerometer at 530.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device, comprising:
   a microphone;
   a surface comprised of a substantially transparent material and having a side exposed to an external environment;
   an accelerometer coupled to the side of the surface exposed to the external environment and configured to obtain at least one measurement of acceleration of the surface based on an acoustic vibration of the surface; and
   a processor coupled to the device, the processor configured to:
     receive the at least one measurement from the accelerometer based on the acoustic vibration of the surface;
     receive an input from the microphone; and
     generate an output based on the input received from the microphone and the at least one measurement, from the accelerometer, based on the acoustic vibration of the surface so that a signal to noise ratio of the output is greater than a signal to noise ratio of the input.

2. The device of claim 1, wherein the at least one measurement from the accelerometer comprises a first audio signal and a first ambient noise.

3. The device of claim 2, wherein the input comprises a second audio signal and a second ambient noise.

4. The device of claim 1, wherein the at least one measurement of acceleration is indicative of proper acceleration.

5. The device of claim 1, the processor further configured to transmit the output to at least one of a mobile device or a computing device.

6. The device of claim 1, the processor further configured to cause at least part of the at least one measurement of acceleration to destructively interfere with at least part of the input from the microphone.

7. The device of claim 2, the processor further configured to:
   invert the first ambient noise to produce an inverted first ambient noise; and
   cause the inverted first ambient noise to destructively interfere with at least part of the input from the microphone.

8. A method, comprising:
   receiving, from an accelerometer, at least one measurement of acceleration of a surface based on an acoustic vibration of the surface, wherein the surface comprises a side that is exposed to an external environment and the accelerometer is coupled to the side of the surface exposed to the external environment;
   receiving an input from a microphone; and
   generating an output based on the input received from the microphone and the at least one measurement, from the accelerometer, based on the acoustic vibration of the surface so that a signal to noise ratio of the output is greater than a signal to noise ratio of the input.

9. The method of claim 8, wherein the surface is comprised of a substantially transparent material.

10. The method of claim 9, wherein the at least one measurement from the accelerometer comprises a first audio signal and a first ambient noise.

11. The method of claim 10, wherein the input comprises a second audio signal and a second ambient noise.

12. The method of claim 9, wherein the at least one measurement of acceleration is indicative of proper acceleration.

13. The method of claim 9, further comprising transmitting the output to at least one of a mobile device or a computing device.

14. The method of claim 9, further comprising causing at least part of the at least one measurement of acceleration to destructively interfere with at least part of the input from the microphone.

15. The method of claim 10, further comprising:
   inverting the first ambient noise to produce an inverted first ambient noise; and
   causing the inverted first ambient noise to destructively interfere with at least part of the input from the microphone.

16. A device, comprising:
   a microphone;
   a surface having a side exposed to an external environment;
   an accelerometer coupled to the side of the surface exposed to the external environment and configured to obtain at least one measurement of acceleration of the surface based on an acoustic vibration of the surface; and
   a processor coupled to the device, the processor configured to:
     receive the at least one measurement from the accelerometer based on the acoustic vibration of the surface;
     receive an input from the microphone; and
     generate an output based on the input received from the microphone and the at least one measurement, from the accelerometer, based on the acoustic vibration of the surface so that a signal to noise ratio of the output is greater than a signal to noise ratio of the input.

17. The device of claim 16, wherein the surface comprises a composite of two or more materials in which at least one of the two or more materials is not substantially transparent, but the surface is substantially transparent.

18. The device of claim 16, wherein the accelerometer is positioned distal to the microphone.

19. The device of claim 16, wherein the surface has a side exposed to an internal environment, the side exposed to the internal environment being disposed between the surface and a housing of the device.

20. The device of claim 16, wherein the microphone is embedded in the surface.

* * * * *